(No Model.) 2 Sheets—Sheet 1.
G. JENNINGS & G. JENNINGS, Jr.
Water Closet.
No. 234,288. Patented Nov. 9, 1880.
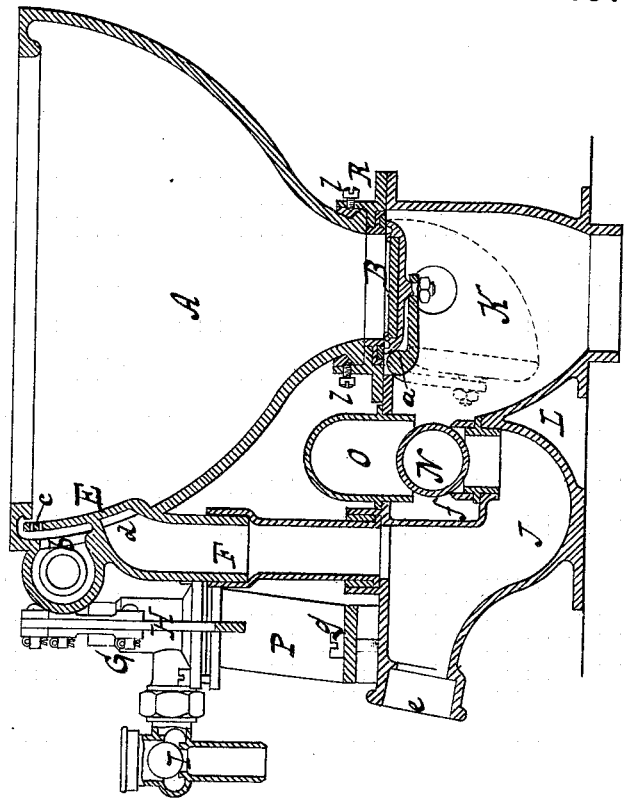
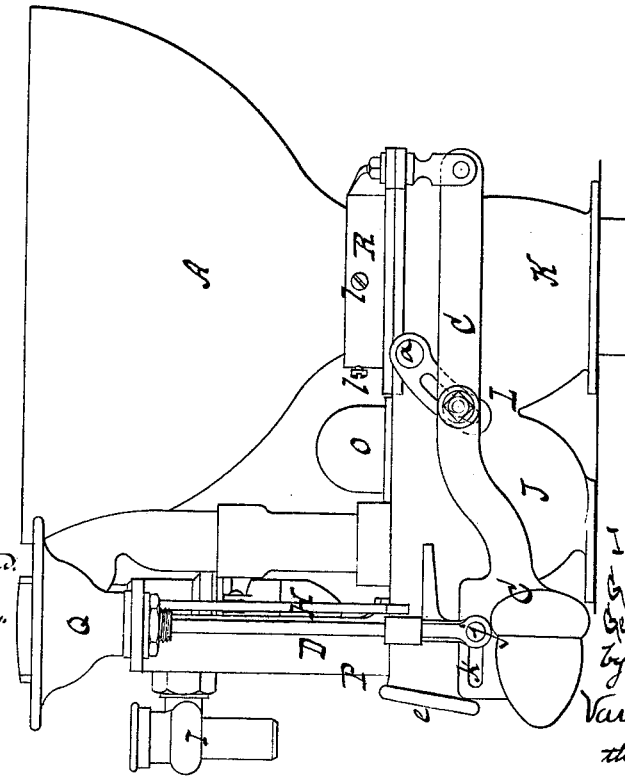

(No Model.) 2 Sheets—Sheet 2.

G. JENNINGS & G. JENNINGS, Jr.
Water Closet.

No. 234,288. Patented Nov. 9, 1880.

Witnesses
Otto Hufeland
William G. Miller

Inventors
George Jennings
George Jennings Jr.
by Van Santvoord & Hauff
their attorneys.

N. PETERS, PHOTO-LITHOGRAPHER, WASHINGTON, D. C.

UNITED STATES PATENT OFFICE.

GEORGE JENNINGS AND GEORGE JENNINGS, JR., OF STANGATE, ENGLAND.

WATER-CLOSET.

SPECIFICATION forming part of Letters Patent No. 234,288, dated November 9, 1880.

Application filed April 14, 1880. (No model.) Patented in England October 16, 1878.

*To all whom it may concern:*

Be it known that we, GEORGE JENNINGS and GEORGE JENNINGS, Jr., of Stangate, in the county of Surrey and Kingdom of England, have invented a new and useful Improvement in Water-Closets, which improvement is fully set forth in the following specification, reference being had to the accompanying drawings, in which—

Figure 3:
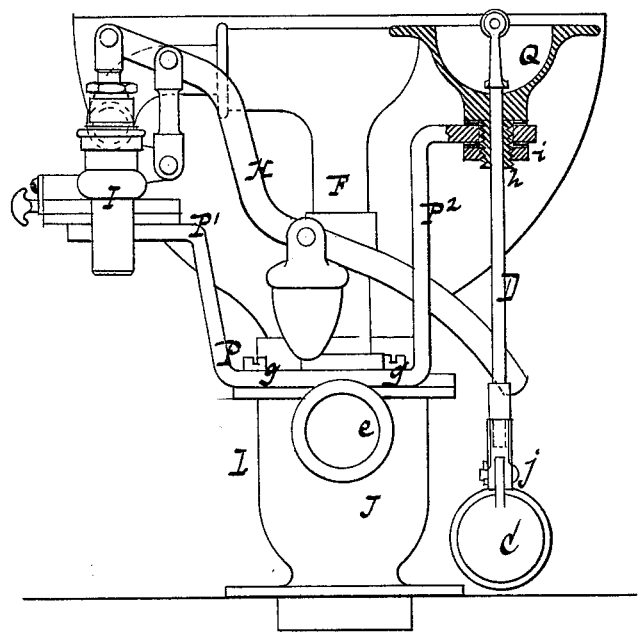
Figure 4:
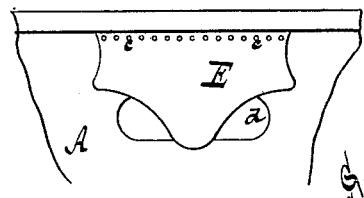

Figure 1 represents a side elevation of a closet embodying our invention. Fig. 2 is a vertical central section. Fig. 3 is a front elevation, partly in section. Fig. 4 is an inner view of a portion of the pan, showing the spreader and overflow.

Similar letters indicate corresponding parts.

Our invention consists in the combination, with the pan of a water-closet, of a spreader arranged over the water-inlet orifice, having openings, whereby a portion of the water supplied to the pan is led over the face of the spreader, thereby freeing such face from soil or other matters; also, in the combination, with the pan and spreader, of an overflow-pipe the mouth of which is adjacent to the spreader, so that it is flushed with each supply of water; also, in the combination of a hopper, an overflow-trap communicating with the hopper, and a check-valve arranged between such trap and hopper for the purpose of increasing the effect of the trap and keeping the latter free of soil or other matters, the valve last named having a spherical shape and being fitted to a chamber which is open at the bottom, thereby remaining free of deposit; further, in the combination, with the base or body of the closet, of a bracket adapted to support the water-supply valve and the handle-frame, so that, besides permitting the ready attachment of these parts, we relieve the handle-frame of strain in the motions of the handle.

In the drawings, the letter A designates the bowl of our closet, provided with the usual gate or discharge-valve B, which swings on a pivot, $a$, and is operated by means of a weighted lever, C, and pull-handle D. The connection between the lever C and handle D is effected by means of a pivot, $j$, working in a slot, $k$, in the lever. Near the top of the pan A is the water-supply orifice $b$, over which is arranged a spreader or fan, E, in the usual manner. We provide this spreader E with holes or openings $c$ near its upper edge, so that the water supplied to the pan discharges in part through these openings, and, running down over the face of the spreader, keeps the same free of soil or other matters.

The letter F designates an overflow-pipe connected to the bowl A. We so arrange this pipe that its mouth $d$ (best seen in Fig. 4) is adjacent to the spreader E—namely, in the rear of or immediately beneath the same. It follows that the mouth of the pipe F is flushed with each supply of water to the pan, and hence the same is insured against being choked.

Another advantage gained by our arrangement of the overflow-pipe F is that the trap into which said pipe enters, as hereinafter described, is always supplied with water.

Water is supplied to the bowl A through a valve, G, having combined therewith a weighted lever, H, that is operated by the pull-handle D simultaneously with the lever C. In advance of the water-supply valve G we locate a check-valve, I, opening in the direction of the flow of water, the shell of this valve being coupled to the supply-valve G at one end and to the water-supply pipe (not shown) at the other end. The effect of the check-valve I is to prevent the flow of gases from the bowl A to the water-supply pipe, so that the water in this pipe, which is the same water used for drinking purposes in a building, is not liable to be tainted by such gases.

At the bottom of the overflow-pipe F is a trap, J, communicating with a hopper or container, K, beneath the bowl A, the trap and the hopper being cast in one piece, (marked L,) which constitutes the base or body of the closet.

A branch, $e$, is formed on the base or body L to connect the trap with a waste-pipe, while a flanged collar, R, adapted to embrace the lower edge of the bowl A, is secured to the base or body over the hopper K, to which collar the pan, in turn, is secured by means of set-screws.

Between the trap J and the hopper K we arrange a check-valve, N, which opens in the direction of the hopper, so that while it allows the necessary discharge from the trap it effectually prevents the back flow of gases, thereby increasing the effect of the trap, while it also prevents any soil or other matters from being splashed into the trap from the hopper.

The check-valve N has a spherical shape, and it rests on a seat, $f$, while it is guided in its up and down movements by a chamber, O, secured to the base or body L above the valve.

The valve N and chamber O are fitted to each other, and the latter is open at the bottom, so that it is not liable to receive a deposit tending to retard the action of the valve.

To a suitable part of the base or body L we fasten a bracket, P, bolts $g$ being preferably used for this purpose. On the bracket P are two arms, $P'$ $P^2$, one of which forms a support for the water-supply valve G and the other a support for a dish or frame, Q, in which the handle D is guided.

For the purpose of attaching the handle-frame Q to the bracket P we usually provide this frame with a nipple, $h$, and, passing this nipple through the bracket, fit thereon a locking-nut, $i$.

It will be seen that by means of the bracket P the valve G and dish or frame Q may be readily attached to the closet, while at the same time the frame is in a great measure relieved of strain, the shock or strain resulting from the motions of the handle being sustained by the bracket.

What we claim as new, and desire to secure by Letters Patent, is—

1. The combination, with a water-closet bowl and an inlet-pipe leading into said bowl through an opening in the wall thereof, of a spreader-plate arranged in front of said opening and provided with one or more perforations, whereby the water will pass through said spreader-plate and be caused to flow across the face of the same, substantially as and for the purpose set forth.

2. The combination, with the water-closet bowl A, having the overflow-opening $d$, of the spreader E, arranged in front of the inlet and extending partially in front of said overflow-opening, whereby the inflowing water is caused to flush the same, substantially as set forth.

3. The combination, with the bowl A, of the hopper K, overflow-trap J, arranged for connection with the waste-pipe, and the check-valve N, arranged between said trap and hopper, substantially as and for the purpose set forth.

4. The combination, with the hopper K and overflow-trap J, of the valve-seat arranged at the entrance of said trap, the ball N, and the open-bottomed chamber O, arranged above said ball to guide the same, substantially as described, and for the purpose set forth.

5. The combination, with the base or body of a water-closet, of a bracket adapted to support the water-supply valve and the handle-frame, substantially as and for the purpose described.

GEORGE JENNINGS.
GEORGE JENNINGS, Jr.

Witnesses:
CHAS. BERKLEY HARRIS,
JOHN DEAN,
*Both of 17 Gracechurch Street, London, E. C.*